United States Patent [19]

Frölich

[11] Patent Number: 5,128,454
[45] Date of Patent: Jul. 7, 1992

[54] β-MODIFIED CRYSTALLINE FED MONOAZO PIGMENT

[75] Inventor: Heinrich Frölich, Niedernhausen, Fed. Rep. of Germany

[73] Assignee: Hoechst Aktiengesellschaft, Frankfurt am Main, Fed. Rep. of Germany

[21] Appl. No.: 482,692

[22] Filed: Feb. 21, 1990

Related U.S. Application Data

[63] Continuation of Ser. No. 285,001, Dec. 15, 1988, abandoned.

[30] Foreign Application Priority Data

Dec. 17, 1987 [DE] Fed. Rep. of Germany ....... 3742815

[51] Int. Cl.$^5$ ................ C09B 67/48; C09B 29/20; D06P 3/79
[52] U.S. Cl. .................. 534/575; 534/864; 534/573; 534/581; 8/526
[58] Field of Search ................ 534/575, 864

[56] References Cited

U.S. PATENT DOCUMENTS

| | | | |
|---|---|---|---|
| 2,687,410 | 8/1954 | Hanke | 539/575 |
| 3,118,870 | 1/1964 | Dietz et al. | 534/575 X |
| 3,928,315 | 12/1975 | Ribka | 534/575 |
| 3,997,523 | 12/1976 | Laubert et al. | 534/575 X |
| 4,002,605 | 1/1977 | Balsley et al. | 534/575 |
| 4,056,522 | 11/1977 | Hunger et al. | 534/575 |
| 4,719,292 | 1/1988 | Schui et al. | 534/575 |

FOREIGN PATENT DOCUMENTS 2510129  1/1983  France ................ 534/575

OTHER PUBLICATIONS

Biedbrmann, J. Soc. Dyers and Colorists, vol. 87, pp. 105 to 111 (1971).

Primary Examiner—Mary C. Lee
Assistant Examiner—Fiona T. Powers

[57] ABSTRACT

The invention relates to a novel crystallographic modification (β-modification) of the pigment of the formula I

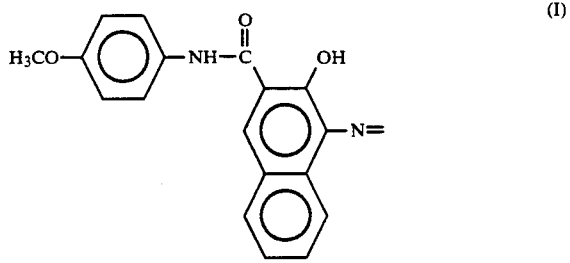

The β-modification shows reflections in the Cu-K$_\alpha$ radiation X-ray diffraction spectrum at the following diffraction angles 2θ (accuracy ±0.2°): at 21.95° a maximum of high intensity, at 5.40°, 7.30°, 10.85°, 14.50° and 27.60° maxima of medium intensity and at 10.05°, 12.80°, 16.40°, 17.95°, 24.65° and 25.80° maxima of low intensity.

The β-modification is obtainable by coupling diazotized N-(3-amino-4-methylbenzoyl)-sulfanilic acid in an aqueous medium in the presence or absence of an organic solvent onto alkali-dissolved 2-hydroxy-4'-methoxy-3-naphthanilide and laking the coupling product by adding a calcium salt, at least one cation-active surfactant having been added at the latest prior to laking, and heating an aqueous suspension of the laked azo dye at a temperature of 130° to 180° C.

The β-modification is suitable for pigmenting printing inks, surface coatings, plastic compositions, filaments and paper, in particular for pigmenting polystyrene, copolymers based on polystyrene, polyolefins, copolymers of polyolefins and polyvinyl chloride.

10 Claims, No Drawings

β-MODIFIED CRYSTALLINE FED MONOAZO PIGMENT

This is a Rule 60 continuation application of U.S. patent application Ser. No. 07/285,001, filed Dec. 15, 1988 now abandoned.

The invention relates to a novel crystallographic modification (β-modification) of the pigment of the formula (I)

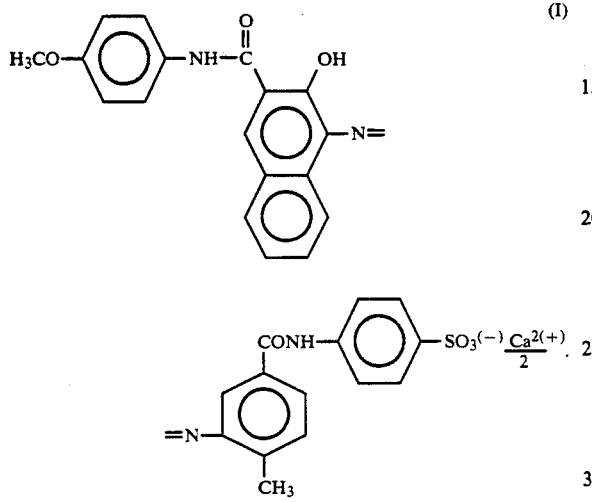

The pigment of the formula (I) known from Example 5 of German Auslegeschrift No. 2,203,0984 (U.S. Pat. No. 3,997,523) is present in the α-modification. The β-modification now found has in part other useful application properties and can be distinguished from the α-modification with the aid of the X-ray diffraction spectrum.

The present invention thus provides a pigment of the abovementioned formula (I) characterized by a Cu-$K_\alpha$ radiation X-ray diffraction spectrum showing reflections at the following diffraction angles 2θ (accuracy ±0.2°): at 21.95° a maximum of high intensity, at 5.40°, 7.30°, 10.85°, 14.50° and 27.60° maxima of medium intensity and at 10.05°, 12.80°, 16.40°, 17.95°, 24.65° and 25.80° maxima of low intensity.

The division of the X-ray reflections into maxima of high, medium and low intensity is based on the measurement of the intensities of X-ray powder spectrograms of the pigment using a scintillation counter as detector (increment width: 0.1°; increment rate: 0.7°/min) and evaluating the magnitude of the count rate measured at a particular maximum relative to the highest maximum.

The present invention also provides a process for preparing the β-modification of the pigment of the formula (I) according to the invention, which comprises coupling diazotized N-(3-amino-4-methylbenzoyl)sulfanilic acid in an aqueous medium in the presence or absence of an organic solvent onto alkali-dissolved 2-hydroxy-4'-methoxy-3-naphthanilide and laking the coupling product by adding a calcium salt, at least one cation-active surfactant having been added at the latest prior to laking, and heating an aqueous suspension of the laked azo dye at a temperature of 130° to 180° C.

The cation-active surfactant may be added prior to azo coupling to the diazo component, to the coupling component or to both or in the course of azo coupling to the reaction mixture or after azo coupling. Preferably, a cation-active surfactant is already present during azo coupling, and the resulting suspension or solution of the coupling product is used directly for laking.

Suitable cation-active surfactants are surfactants where the cationic structure is already present in the molecule, for example surfactants of the type of the quaternary ammonium and phosphonium salts, tertiary sulfonium salts, N,N-dialkylimidazolines and N-alkylpyridinium salts, or those surfactants where the cationic structure does not come about until formed in aqueous solution by protonation, for example surfactants of the type of the primary, secondary and tertiary amines which may also contain a plurality of cation-active centers. Preferred suitability is possessed by cation-active surfactants having at least one long-chain alkyl radical of 8 to 24 carbon atoms, in particular 10 to 18 carbon atoms. Examples of suitable cation-active surfactants are alkyltrimethylammonium salts, such as decyl-, lauryl-, myristyl-, cetyl- or stearyl-trimethylammonium chloride or mixtures thereof, and also alkyldimethylbenzylammonium salts such as decyl-, lauryl-, myristyl-, cetyl- or stearyl-dimethylbenzylammonium chloride or mixtures thereof. Also suitable are fatty amines of 8 to 18 carbon atoms. The preferred cation-active surfactant is cetyltrimethylammonium chloride. The amount of cation-active surfactant is in general about 1 to 20% by weight of surfactant, preferably 1.5 to 5% by weight of surfactant, based on the weight of the azo coupling product in the acid form. In most cases it is favorable to employ the minimum possible amount of cation-active surfactant, in order to keep the residual level of this surfactant in the pigment at a minimum and substantially avoiding any adverse effect on the fastness properties of the pigment. The minimum and optimum amounts of cation-active surfactant are dependent on the structure of the particular surfactant and can be determined in a few preliminary experiments.

Azo coupling can be carried out in a conventional manner, in which case the addition of further surfactants, in particular nonionic surfactants, to the diazo component or coupling component or to both may be advantageous. The coupling component is used in an alkali-dissolved form, preferably dissolved in the solution of an alkali metal hydroxide, in particular in sodium hydroxide solution.

The subsequent laking can likewise be carried out in a conventional manner. For example, the alkaline suspension or solution of the coupling product obtained is brought to a neutral pH prior to laking, possibly by temporarily stirring within the acid range. The coupling product then present in the form of its suspended or dissolved alkali metal salt is laked by the addition of a solid or dissolved calcium salt. Laking is in general effected by adding solid or dissolved calcium chloride to the suspension of the alkali metal salt of the azo dye at a temperature up to the boiling point of the suspension.

To obtain the laked azo dye in a particularly soft-textured form, it can be advantageous to carry out the laking in the additional presence of dispersants, for example anion-active or nonionic dispersants. For example, use of small amounts of the condensation product of oleyl chloride and methylaminoacetic acid or 2-methylaminoethanesulfonic acid and also partial fatty acid esters of glycerol has proved useful.

Following laking, the pigment is initially obtained in a crystal form which in the X-ray diffraction spectrum does not differ significantly from the known α-modification of the pigment. To effect conversion into the β-modification according to the invention, the pigment suspension obtained, or the pigment suspension obtained after intermediate isolation of the pigment and suspending the pigment press cake in water, is heated for some time in a sealed vessel at 130° to 180° C., preferably from 135° to 160° C. The conversion into the β-modification can be effectively demonstrated by comparing the abovementioned characteristic X-ray diffraction spectrum of the β-modification with that of the α-modification. The α-modification is characterized by comparison by a Cu-K$_\alpha$ radiation X-ray diffraction spectrum showing reflections at the following diffraction angles 2θ (accuracy ±0.2°): at 6.85°, 10.80°, 17.05°, 20.10°, 21.40°, 27.50° and 27.70° maxima of high intensity, at 9.15°, 11.45°, 21.95° and 22.75° maxima of medium intensity and at 12.85°, 14.24°, 15.35°, 23.60°, 24.35°, 25.15°, 26.05°, 29.30°, 29.75° and 31.95° maxima of low intensity. These reflections and their intensities are measured as in the case of the β-modification.

Following conversion into the β-modification, the aqueous suspension of the pigment can be further processed in a conventional manner. In general, the pigment is initially isolated in the form of an aqueous press cake which is washed with water, dried and ground. The pigment powder obtained is then employed for pigmenting application media. The pigment suspension may possibly also be spray-dried or processed directly into pigmentary products.

Although the β-modification of the pigment is formed in the process according to the invention essentially only in the course of the thermal treatment at 130° C. or more, the specific form of the laked azo dye formed in the course of the preparation according to the invention in the presence of a cation-active surfactant is also a reason for the formation of the β-modification. This is because, unlike the product obtained according to the invention after azo coupling and laking, the pigment is obtained by the process of Example 5 of German Auslegeschrift No. 2,203,094 (U.S. Pat. No. 3,997,523) in a form which is not converted into the β-modification even in the course of a heat treatment at 130° to 180° C. as per the process according to the invention but retains the crystal lattice of the α-modification.

The novel β-modification of the laked azo dye of the formula (I) has a significantly more yellowish red hue than the known α-modification. The change in hue in HD (high density) polyethylene corresponds to a hue angle shift of about 10° to 11° according to German Standard Specification DIN 6174 (CIELAB formula) at a standard depth of shade ST ⅓ according to German Standard Specification DIN 53235.

The pigment is notable for a brilliant yellowish red hue, good color strength, good dispersibility and excellent fastness properties, such as migration fastness and heat resistance. It is readily incorporable in polyolefins, for example polyethylene, giving a pigmentation of good color strength, excellent cleanliness of hue and good warpage properties. Masstone-pigmented polyvinyl chloride shows good results on exposure to light in respect of hue stability and resistance to darkening.

The present invention therefore also provides a method of using the β-modification of the pigment of the formula (I) according to the invention for pigmenting natural and synthetic materials. The pigment according to the invention is suitable for example for pigmenting printing inks, surface coatings, thermoplastic and thermosetting compositions, such as natural resins and synthetic resins, for example polymerization resins, condensation resins, silicone resins or casein resins, polystyrene and copolymers thereof, polyolefins, in particular polyethylene or polypropylene, polyacrylic compounds, polyvinyl compounds, for example polyvinyl chloride or polyvinyl acetate, polyesters and rubber, and also filament of viscose or cellulose ethers, cellulose esters, polyamides, polyurethanes, polyglycol terephthalates and polyacrylonitrile. It is also suitable for pigment printing and for the wet-end coloring of paper. Owing to its excellent heat resistance, the pigment is suitable in particular for pigmenting polystyrene, copolymers based on polystyrene, polyolefins, in particular polyethylene and polypropylene, and corresponding copolymers and also polyvinyl chloride.

In the examples that follow, parts and percentages are by weight, unless otherwise stated. Parts by volume bear the same relation to parts by weight as the liter to the kilogram.

EXAMPLES 1) 196.8 parts of the sodium salt of N-(3-amino-4-methylbenzoyl)sulfanilic acid are added with stirring to 1000 parts of water in the presence of 3 parts of an alkyl polyglycol ether, followed by 257.8 parts of 31% strength aqueous hydrochloric acid. After the mixture has been stirred, 110 parts of 38% strength aqueous sodium nitrite solution are added at 20° to 25° C. in the course of 30 minutes and stirred in at room temperature for a further 1½ hours. After the excess of nitrous acid has been destroyed by the addition of sulfamic acid, 37.3 parts of a 29% strength aqueous solution of cetyltrimethylammonium chloride (alkyl radical corresponds to at least 90% of $C_{16}$-alkyl) are added. The resulting suspension of the diazonium salt is then added in the course of 45 minutes at a temperature of 0° to 20° C. with stirring to a clarified solution of coupling component previously prepared from 181.1 parts of 2-hydroxy-4'-methoxy-3-naphthanilide, 800 parts of water, 63.6 parts of calcined sodium carbonate and 146.7 parts of 33% strength sodium hydroxide solution by heating. After the coupling has ended, the mixture is brought to pH 5 by the careful addition of 31% strength hydrochloric acid, subsequently stirred for 10 minutes and then returned to pH 7 by the addition of dilute sodium hydroxide solution. A solution of 6.12 parts of the sodium salt of the condensation product of oleyl chloride and methylaminoacetic acid is then added, and the suspension is heated up by passing steam into it. When a temperature of 85° C. is reached, 24 parts of a partial fatty acid ester of glycerol are added. When a temperature of 90° C. is reached, laking is brought about by adding 168 parts of commercially available 80% strength calcium chloride and then keeping the temperature at 90° C. for a further 15 minutes.

To bring about conversion to the β-modification, the pigment suspension obtained is heated with stirring in a suitable sealed vessel to 155° C. in the course of 45 minutes and is maintained at 155° C. for 3 hours. After cooling down and pressure equilibration, the pigment is filtered off with suction at 70° C., washed and dried. The pigment obtained shows in a Cu-K$_\alpha$ radiation X-ray diffraction spectrum the reflections characteristic for the β-modification of the pigment. The yellowish-red pigment has a brilliant hue which is yellower than the hue of the pigment int the α-modification as obtained in Example 5 of DE Auslegeschrift 2,203,094.

2) Example 1 is repeated up to and including laking by the addition of calcium chloride. After the addition of calcium chloride the suspension of the laked coupling product is heated at 90° C. for a further hour, and the laked coupling product is then filtered off with suction and washed with water. 386 parts of the press cake obtained (about ⅓ of the entire press cake) are suspended in 1114 parts of water, additionally admixed with 4.5 parts of 80% strength calcium chloride and heated to 145° C. in a sealed vessel. 2 hours at 145° C. is followed by cooling down to 70° C., and the pigment is filtered off with suction, washed with water and dried. The properties of the pigment obtained conform to the properties of the β-modification as obtained in Example 1.

3) Example 2 is repeated, except that the cetyltrimethylammonium chloride is replaced by an alkyltrimethylammonium chloride having an alkyl chain distribution of about 70% of $C_{12}$, 25% of $C_{14}$ and 5% of $C_{16}$ and the press cake, isolated as in Example 2 and resuspended in press cake, isolated as in Example 2 and resuspended in water, is heated at 160° C. for 2 hours. This again gives the β-modification pigment having the properties described.

4) Example 3 is repeated, except that the alkyltrimethylammonium chloride is replaced by an alkyldimethylbenzylammonium chloride having an alkyl chain distribution of about 2% of $C_{10}$, 57% of $C_{12}$, 23% of $C_{14}$, 11% of $C_{16}$ and 7% of $C_{18}$. The β-modification of the pigment having the properties described in Example 1 is obtained.

5) Example 1 is repeated, except that the 37.3 parts of a 29% strength solution of cetyltrimethylammonium chloride are replaced by 53.8 parts of 29% strength solution of cetyltrimethylammonium chloride. The resulting pigment is present in the β-modification and has similar properties to those of the pigment of Example 1.

6) Comparative example. To test whether the α-modification of the pigment of the formula (I) obtained as described in DE Auslegeschrift 2,203,094 (U.S. Pat. No. 3,997,523) is convertible into the β-modification according to the invention, the following procedure is adopted:

65.6 parts of the sodium salt of N-(3-amino-4-methylbenzoyl)-sulfanilic acid are diazotized as described in Example 5 of German Auslegeschrift 2,203,094 and coupled in the presence of the nonionic assistant specified there, namely the condensation product of 1 mole of oleyl alcohol and 30 moles of ethylene oxide, with 2-hydroxy-4'-methoxy-3-naphthanilide. The procedure of Example 5 of DE Auslegeschrift 2,203,094 is then followed up to and including the addition of the calcium chloride solution. After the calcium chloride solution has been added, the pigment suspension is maintained at 90° C. for a further 10 minutes and then heated with stirring in a sealed vessel to 155° C. After 3 hours at 155° C. the suspension is cooled down to 70° C., and the pigment is filtered off with suction, washed with water and dried. An X-ray diffraction spectrum of the pigment obtained shows the reflections characteristic of the α-modification. Accordingly, no conversion into the β-modification has taken place. As a result of the heating at 155° C., which compared with the process of DE Auslegeschrift 2,203,094 (U.S. Pat. No. 3,997,523) is a higher temperature for the aftertreatment, the pigment has merely been reduced in color strength and the hue of the α-modification has not changed.

7) Comparative example: Example 6 is repeated, except that the pigment suspension obtained is heated, not at 155° C. for 3 hours, but at 160° C. for 6 hours. The pigment obtained has the features of the α-modification, not only as regards hue, but also in the X-ray diffraction spectrum. Compared with the pigment of Example 5 of DE Auslegeschrift 2,203,094 (U.S. Pat. No. 3,997,523), the pigment has a reduced color strength.

8) Comparative example: Example 6 is repeated up to and including laking by the addition of calcium chloride solution. After 10 minutes at 90° C. the suspension is filtered hot with suction, and the pigment washed with water. The moist press cake is pasted as described in Example 5 of DE Auslegeschrift 2,203,904 in about 2000 parts of water and admixed with 5 parts by volume of 2N sodium hydroxide solution and a mixture of 50 parts by volume of 2N sodium hydroxide solution and 50 parts by volume of 2N calcium chloride solution. After the pigment suspension has been heated to 80° C., 4 parts of a partial fatty acid ester of glycerol are added, and the batch is then kept at 145° C. in a sealed vessel for 2 hours. After the pigment has been isolated and ground as described in Example 1, the pigment is obtained in the known α-modification.

9) Comparative example: Example 8 is repeated, except that the pigment suspension is heated, not at 145° C. for 2 hours, but at 160° C. for 2 hours. After the pigment has been isolated and ground as described in Example 1, the known α-modification is obtained. Here too no conversion into the β-modification of the invention has taken place.

I claim:

1. A pigment of the formula (I)

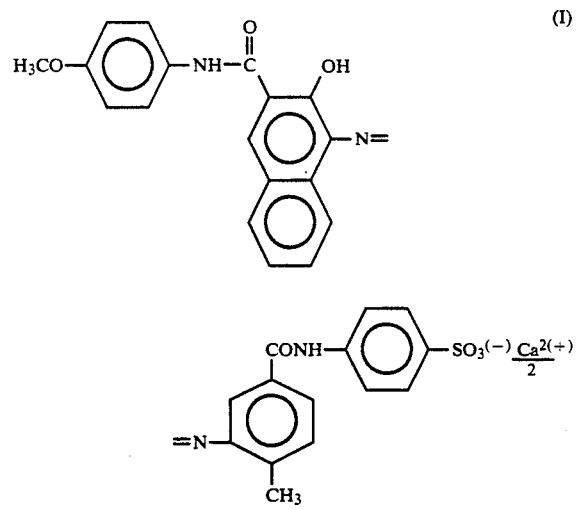

which is present in a modification (β-modification) which in a Cu-$K_\alpha$ radiation X-ray diffraction spectrum shows reflections at the following diffraction angles $2\theta$ (accuracy ±0.2°): at 21.95° a maximum of high intensity, at 5.40°, 7.30°, 10.85°, 14.50° and 27.60° maxima of medium intensity and at 10.05°, 12.80°, 16.40°, 17.95°, 24.65° and 25.80° maxima of low intensity.

2. A process for preparing the β-modification of the pigment of formula (I) as claimed in claim 1, which comprises coupling diazotized N-(3-amino-4-methylbenzoyl)sulfanilic acid in an aqueous medium in the presence or absence of an organic solvent onto alkali-dissolved 2-hydroxy-4'-methoxy-3-naphthanilide and laking the coupling product by adding a calcium salt, at least one cation-active surfactant having been added at the latest prior to laking, and heating an aqueous suspension of the laked azo dye at a temperature of 130° to 180° C.

3. The process as claimed in claim 2, wherein the aqueous suspension of the laked azo dye is heated to a temperature of 135° to 160° C.

4. The process as claimed in claim 2, wherein at least one cation-active surfactant from the group consisting of quaternary ammonium salts, quaternary phosphonium salts, tertiary sulfonium salts, N,N-dialkylimidazolines, N-alkylpyridinium salts and primary, secondary and tertiary amines is added.

5. The process as claimed in claim 4, wherein the cation-active surfactant has at least one long-chain alkyl radical of 8 to 24 carbon atoms.

6. The process as claimed in claim 2, wherein the cation-active surfactant is an alkyltrimethylammonium salt or an alkyldimethylbenzylammonium salt.

7. The process as claimed in claim 2, wherein the amount of cation-active surfactant added is 1 to 20% by weight, based on the weight of the coupling product in the acid form.

8. The process as claimed in claim 4, wherein the cation-active surfactant is an alkyltrimethylammonium salt or an alkyldimethylbenzylammonium salt.

9. The process as claimed in claim 8, wherein the amount of cation-active surfactant is 1 to 20% by weight, based on the weight of the coupling product in the acid form.

10. The process as claimed in claim 9, wherein the aqueous suspension of the laked azo dye is heated to a temperature of 135° to 160° C.

* * * * *